United States Patent
Baumgarte et al.

(10) Patent No.: US 11,551,499 B2
(45) Date of Patent: *Jan. 10, 2023

(54) SECURE CONTAINER FOR PACKAGE DELIVERY

(71) Applicant: Schlage Lock Company LLC, Carmel, IN (US)

(72) Inventors: Joseph W. Baumgarte, Carmel, IN (US); Robert Prostko, Carmel, IN (US); Brian C. Eickhoff, Danville, IN (US); Rockwood T. Roberts, III, Carmel, IN (US); Robert Martens, Carmel, IN (US); Scott Baxter, Carmel, IN (US); Roger Barrett, Zionsville, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/190,201

(22) Filed: Mar. 2, 2021

(65) Prior Publication Data

US 2021/0327183 A1    Oct. 21, 2021

Related U.S. Application Data

(63) Continuation of application No. 16/178,183, filed on Nov. 1, 2018, now Pat. No. 10,937,261.

(Continued)

(51) Int. Cl.
*G07C 9/00* (2020.01)
*H04L 9/32* (2006.01)
(Continued)

(52) U.S. Cl.
CPC ..... *G07C 9/00896* (2013.01); *G05B 19/4155* (2013.01); *G07C 9/00182* (2013.01); *G07C 9/00309* (2013.01); *G07C 9/215* (2020.01); *H04L 9/3226* (2013.01); *H04L 9/3242* (2013.01); *G05B 2219/37431* (2013.01); *G07C 2009/0092* (2013.01); *G07C 2009/00412* (2013.01); *H04L 2209/80* (2013.01)

(58) Field of Classification Search
None
See application file for complete search history.

(56) References Cited

U.S. PATENT DOCUMENTS

| 3,554,368 A | 1/1971 | Nagel |
| 6,262,664 B1 | 7/2001 | Maloney |

(Continued)

*Primary Examiner* — Adolf Dsouza
(74) *Attorney, Agent, or Firm* — Taft Stettinius & Hollister LLP

(57) ABSTRACT

A method includes transmitting, by a handler device associated with a package handler, a message to an access control system requesting access to a secure container secured by an electronic lock mechanism; determining, by the access control system, whether the package handler is authorized to access the secure container based on the received message; transmitting, by the access control system, an unlock command to the secure container in response to a determination that the package handler is authorized to access the secure container; and unlocking the electronic lock mechanism of the secure container in response to successful authentication of the unlock command.

19 Claims, 10 Drawing Sheets

Related U.S. Application Data

(60) Provisional application No. 62/580,206, filed on Nov. 1, 2017.

(51) Int. Cl.
*G05B 19/4155* (2006.01)
*G07C 9/20* (2020.01)

(56) References Cited

U.S. PATENT DOCUMENTS

| | | |
|---|---|---|
| 8,138,886 B1 | 3/2012 | Chang |
| 9,892,579 B2 | 2/2018 | Ku |
| 10,264,906 B2 | 4/2019 | Bloom et al. |
| 2012/0031154 A1 | 2/2012 | Spiegel et al. |
| 2013/0335193 A1* | 12/2013 | Hanson .............. G07C 9/00174 340/5.61 |
| 2015/0371468 A1 | 12/2015 | MacKin et al. |
| 2016/0235236 A1 | 8/2016 | Byers et al. |
| 2017/0073085 A1 | 3/2017 | Tremblay et al. |
| 2017/0251856 A1 | 9/2017 | Schaible |
| 2017/0355076 A1 | 12/2017 | Gordon-Carroll et al. |
| 2018/0205682 A1* | 7/2018 | O'Brien, V ........ G06Q 10/0833 |

\* cited by examiner

SECURE CONTAINER FOR PACKAGE DELIVERY

CROSS-REFERENCE TO RELATED APPLICATIONS

This application is a continuation of U.S. patent application Ser. No. 16/178,183 filed Nov. 1, 2018 and issued as U.S. Pat. No. 10,937,261, which claims the benefit of U.S. Provisional Application No. 62/580,206 filed on Nov. 1, 2017, the contents of each application incorporated herein by reference in their entirety.

BACKGROUND

The advent of e-commerce as a mainstay for daily purchases has welcomed a significant increase in the number of packages received by families on a daily basis. Even basic home essentials are being shipped directly to the homes of individuals instead of being purchased at a traditional brick-and-mortar store. However, this increase also precipitated a rise in the number of unattended packages being stolen from the front porches of residences. Homeowners have attempted to combat these thefts by installing video surveillance systems including, for example, video doorbells, which occasionally assist law enforcement with identifying thieves, but few options exist for homeowners to prevent the theft from ever occurring.

SUMMARY

According to one embodiment, a method includes transmitting, by a handler device associated with a package handler, a message to an access control system requesting access to a secure container secured by an electronic lock mechanism, determining, by the access control system, whether the package handler is authorized to access the secure container based on the received message, transmitting, by the access control system, an unlock command to the secure container in response to a determination that the package handler is authorized to access the secure container, and unlocking the electronic lock mechanism of the secure container in response to successful authentication of the unlock command.

In some embodiments, transmitting the unlock command from the access control system to the secure container may include transmitting the unlock command from the access control system to a gateway device, and forwarding the unlock command by the gateway device to the secure container. In some embodiments, forwarding the unlock command may include transmitting the unlock command from the gateway device to the secure container over a Wi-Fi communication connection established between the gateway device and the secure container.

In some embodiments, the unlock command may include a caveated cryptographic bearer token that includes a time-based caveat defining a time limit for accessing the secure container. Further, in some embodiment, the caveated cryptographic bearer token may be or may include a macaroon. In some embodiments, the method may further include locking the electronic lock mechanism of the secure container in response to a determination that a package has been placed in the secure container. In some embodiments, the method may further include capturing an image of at least one of the package or the package handler with a camera of the secure container. In some embodiments, the method may further include regulating a temperature of the secure container based on the package placed in the secure container. In some embodiments, the method may further include transmitting, by the secure container, a notification message to an owner device indicating that the package has been delivered in response to the determination that the package has been placed in the secure container.

According to another embodiment, an access control system may include a secure container and a server. The secure container may include a housing having a chamber defined therein for storage of a package, a movable barrier secured to the housing and adapted to move between an open position to allow access to the chamber and a closed position to prevent access to the chamber, an electronic lock mechanism adapted to move between a locked position and an unlocked position, and a control system. The server may include a server having a first processor and a first memory having a first plurality of instructions stored thereon that, in response to execution by the first processor, causes the server to receive a message from a handler device associated with a package handler requesting access to the chamber of the secure container and transmit an unlock command to the secure container in response to a determination that the package handler is authorized to access the chamber of the secure container. Further, the secure container may be configured to transmit a control signal from the control system to the electronic lock mechanism to unlock the electronic lock mechanism to allow movement of the movable barrier from the closed position to the open position in response to successful authentication of the unlock command.

In some embodiments, the access control system may further include a gateway device including a second processor and a second memory. Further, transmission of the unlock command to the secure container may include transmission of the unlock command from the server to the gateway device, and the second memory of the gateway device may include a second plurality of instructions stored thereon that, in response to execution by the second processor, causes the gateway device to receive the unlock command from the server and forward the unlock command to the secure container. In some embodiments, the control system may include a Wi-Fi communication circuitry, and the gateway device may be configured to forward the unlock command to the secure container over a Wi-Fi communication connection established between the gateway device and the secure container. In some embodiments, the secure container may be configured to transmit a control signal from the control system to the electronic lock mechanism to lock the electronic lock mechanism of the secure container in response to a determination that a package has been placed in the chamber of the secure container and the movable barrier is in the closed position. In some embodiments, the access control system may further include a camera system configured to capture an image of at least one of the package or the package handler.

In some embodiments, the secure container may further include a temperature control system configured to regulate a temperature of the chamber of the secure container based on the package placed in the chamber. In some embodiments, the control system of the secure container may include a wireless communication circuitry configured to transmit a notification message to an owner device indicating that the package has been delivered in response to the determination that the package has been placed in the chamber of the secure container. In some embodiments, the control system of the secure container may include a power circuitry configured to receive AC mains power.

According to yet another embodiment, a method may include determining, by an access control system, whether a package handler associated with a handler device is authorized to access a secure container secured by an electronic lock mechanism, generating, by the access control system, a caveated cryptographic bearer token in response to a determination that the handler is authorized to access the secure container, wherein the caveated cryptographic bearer token includes a time-based caveat that defines a time limit for accessing the secure container, transmitting, by the access control system, the caveated cryptographic bearer token to the handler device in response to generation of the caveated cryptographic bearer token, transmitting, by the handler device and in response to receipt of the caveated cryptographic bearer token from the access control system, a request to access the secure container to the secure container over a wireless communication connection between the handler device and the secure container, wherein the request includes the caveated cryptographic bearer token, authenticating, by the secure container, the request based on the received caveated cryptographic bearer token, a base cryptographic bearer token stored on the secure container, and a real-time clock of the secure container, and unlocking the electronic lock mechanism of the secure container in response to successful authentication of the received caveated cryptographic bearer token.

In some embodiments, transmitting the caveated cryptographic bearer token from the access control system to the handler device may include transmitting the caveated cryptographic bearer token from a first cloud server associated with the secure container to a second cloud server associated with the package handler, and forwarding the caveated cryptographic bearer token from the second cloud server to the handler device. In some embodiments, the caveated cryptographic bearer token may be or may include a macaroon.

Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
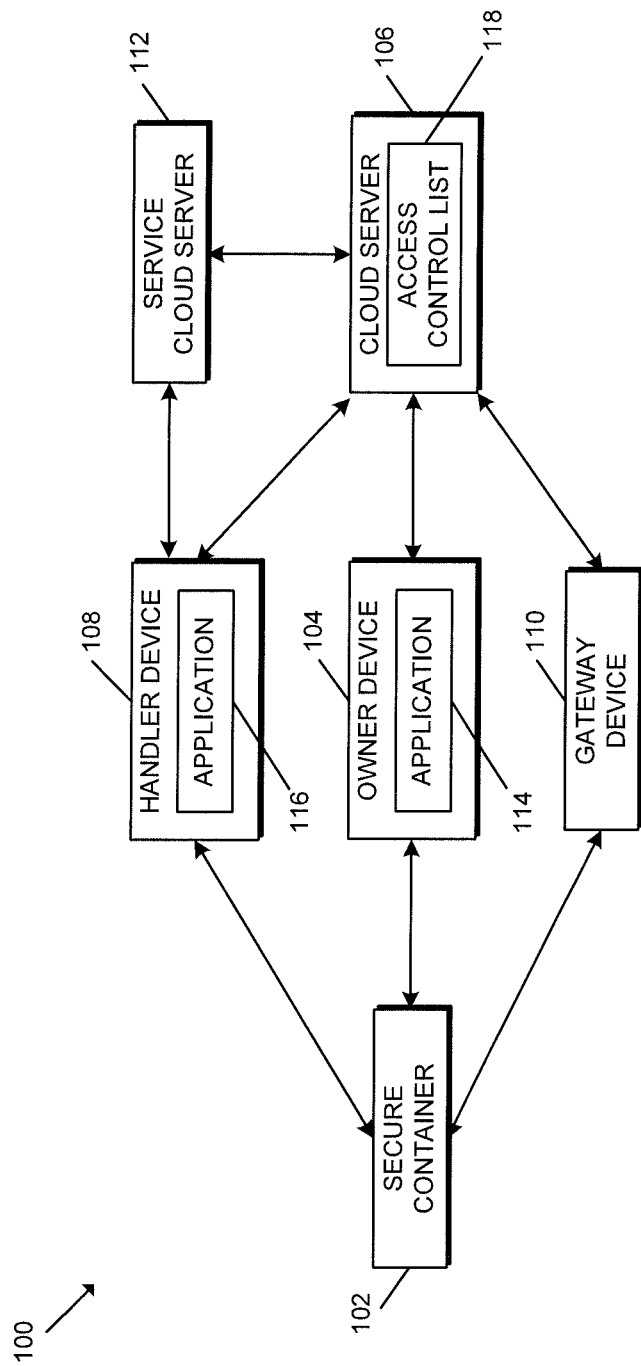
FIG. 1 is a simplified block diagram of at least one embodiment of an access control system for secure package delivery.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, an access control system 100 for secure package delivery includes a secure container 102, an owner device 104, a cloud server 106, a handler/guest device 108, a gateway device 110, and a service cloud server 112. However, it should be appreciated that one or more of the devices of the access control system 100 may be omitted in some embodiments (e.g., the gateway device 110 and/or the service cloud server 112). As described in detail below, the access control system 100 includes a secure container 102 for receiving and securely storing delivered packages. In particular, instead of dropping off a package on the front porch of a residence, for example, a delivery person or other package handler may deliver the package to the secure container 102 at the same location, which may be locked after delivery (e.g., automatically) to prevent a thief from having any chance of a successful snatch-and-grab of the package once delivered. To do so, the access control system 100 enables the package handler to request (e.g., via the handler device 108) access to the secure container 102 during delivery. In particular, the handler device 108 may transmit a request for access to the secure container 102 to the cloud server 106, which authenticates the request (e.g., based on a unique identifier associated with the package handler and/or the handler device 108). If authenticated, depending on the particular embodiment, the cloud server 106 may transmit an unlock command to the secure container 102 or provide an access token/credential to the handler device 108 to be presented to the secure container 102 for access thereto. It should be appreciated that the access token/credential may be transmitted to the handler device 108 directly or indirectly (e.g., through a cloud-to-cloud interface with the service cloud server 112). Further, in some embodiments, the unlock command may be transmitted to the secure container 102 through the gateway device 110.

Accordingly, it should be appreciated that, in some embodiments, the illustrative access control system 100 allows for flexible access to and/or control over the secure container 102 by the owner device 104 (e.g., of the owner of the secure container 102 and/or address at which the secure container 102 is located), the handler device 108 (e.g., of the package handler/deliverer), and/or the gateway device 110. For example, in some embodiments, the owner of a secure container 102 may invite others (package handlers) to have access to the secure container 102 without being present at the secure container 102 or having a real-time connection to the secure container 102. To do so, the access control system 100 may utilize connectivity to a cloud server 106 that distributes access tokens to the owner device 104, the handler device 108 and/or the gateway device 110 for use with a specific secure container 102. In particular, in some embodiments, the access tokens may be embodied as caveated cryptographic bearer tokens (e.g., macaroons). It should be further appreciated that, in some embodiments, the access control list of authorized users of the secure container 102 may be stored on the cloud server 106 such that the secure container 102 is not required to locally store an access control list. In such embodiments, the secure container 102 is not limited, for example, in the number of handlers that can access and/or otherwise control the secure container 102 and/or other limitations associated with having finite onboard memory. Instead, as described herein, the secure container 102 may store a base macaroon (or other base cryptographic bearer token), which may be compared (e.g., directly or indirectly) to derived macaroons or contextual cryptographic bearer tokens to determine whether a particular user/device should be granted access/control. In other embodiments, the access control system 100 may, additionally or alternatively, leverage one or more other types of access tokens or cryptosystems.

In some embodiments, the access control system 100 may leverage the flexibility associated with contextual cryptographic bearer tokens (e.g., macaroons) for access control. For example, as described below, the secure container 102 and the owner device 104 may communicate with one another during a setup or registration process in which a base cryptographic bearer token (e.g., a base macaroon) with a base set of restrictions is generated (e.g., a valid after date/time, a particular security model, etc.). Once generated and submitted to the cloud server 106, the cloud server 106 may append additional caveats to the base cryptographic bearer token and its restrictions, for example, to reduce the duration the token is valid or limit the permissions given to a particular user/handler. In particular, in doing so, the cloud server 106 may employ a cryptographic hash function (e.g., an HMAC) to hash the additional caveats to the base cryptographic bearer token to generate a derived or caveated cryptographic bearer token (e.g., a derived macaroon). It should be appreciated that, in the illustrative embodiment, the additional caveats may only modify the base token to be more restrictive than the base token, which prevents a handler, for example, from obtaining greater privileges than the owner of the secure container 102.

As shown in FIG. 1, the illustrative owner device 104 includes an application 114 that enables the owner of the secure container 102 to register an account with the cloud server 106 or cloud service associated therewith. In some embodiments, it should be appreciated that the owner's secure login (e.g., username and password) to the cloud server/service may constitute a separate security domain from the security domain associated with the flexible tokens described herein. The application 114 may further provide a user interface by which the owner may enter user input associated with registering a particular secure container 102 to the owner. Additionally, in some embodiments, after a base cryptographic bearer token (e.g., base macaroon) and/or other access token is generated and stored to the secure container 102 and the cloud server 106, the token may be removed from the owner device 104. In such embodiments, the owner may subsequently use the application 114 to retrieve a caveated bearer token to access/control the secure container 102 in a manner similar to that described below in reference to a package handler. In other embodiments, the base cryptographic bearer token and/or other access token may be secured stored by, and not deleted from, the owner device 104.

The handler device 108 may similarly include an application 116 that enables a particular package handler to register an account with the cloud server/service, request and/or receive an invitation from the owner to access/control a particular secure container 102, request and/or receive caveated cryptographic bearer tokens (e.g., macaroons) or other access tokens for access/control of particular secure containers 102, and interact with the secure containers 102. Depending on the particular embodiment, the handler device 108 may communicate directly or indirectly with the cloud server 106 to obtain the access token and/or unlock command for access to the secure container 102. As such, in some embodiments, it should be appreciated that the delivery service with which the package handler is associated (e.g., the handler's employer) may have a service cloud server 112 that acts as an intermediary between the package handler and the owner. For example, the cloud server 106 and the service cloud server 112 may coordinate with one another via a cloud-to-cloud interface such that an access token generated by the cloud server 106 may be transmitted to the service cloud server 112 for subsequent forwarding/delivery to the appropriate handler device 108 of the package handler associated with that particular route. As such, it should be appreciated that various communications and/or other features described herein may apply to a handler entity, which may act as an intermediary for the handler device 108 itself. In other embodiments, for example, an appropriate link for access to the cloud server 106 may be transmitted to the handler device 108, which allows the handler device 108 to retrieve the access token from the cloud server 106 directly.

The applications 114, 116 may be embodied as any suitable applications for performing the functions described herein. For example, in some embodiments, the owner device 104 and the handler device 108 are embodied as mobile devices. In such embodiments, the applications 114, 116 may be embodied as mobile applications (e.g., smartphone applications). In some embodiments, it should be appreciated that one or more of the applications 114, 116 may serve as a client-side user interface for a web-based application or service of the cloud server 106.

As shown in FIG. 1, in some embodiments, the cloud server 106 includes an access control list 118. In such embodiments, the access control list 118 may identify each secure container 102 registered to the cloud server/service, the ownership of each of those secure containers 102, and the handlers (if any) permitted access to each of those secure containers 102. In some embodiments, each user (e.g., owner/handler) may be associated with a universally unique identifier (UUID) generated during the secure login with the cloud server 106 (e.g., generated as a JWT token). In such embodiments, it should be appreciated that the owner and handlers of a particular secure container 102 may be identified in the access control list 118 by the corresponding UUID of that owner or handler. Each secure container 102 may be similarly identified based on a programming/security code and/or a unique container identifier. For example, in some embodiments, each secure container 102 may be identified based on a programming code visually identified on a component of the secure container 102 (e.g., the back of the secure container 102), included on paperwork provided with the secure container 102 upon purchase of the secure container 102, and/or stored in a memory of the secure container 102 and securely transferrable. As described above, in some embodiments, the handler entity rather than the handler or handler device 108 itself may be identified via a unique identifier or otherwise. As such, in some embodiments, the access control list 118 may uniquely identify a handler entity (e.g., a delivery company) permitted access to a particular secure container 102.

As described in detail below, in the illustrative embodiment, the owner device 104 and the handler device 108 are embodied as mobile devices, and the secure container 102 may communicate with the owner device 104 and the handler device 108 over any suitable wireless communication connection (e.g., Bluetooth, Wi-Fi, etc.) established between the secure container 102 and the device 104, 108. Additionally, in the illustrative embodiment, the owner device 104 and the handler device 108 may communicate with the cloud server 106 using any suitable wireless communication connection. For example, in various embodiments, the owner device 104 and/or the handler device 108 may communicate with the cloud server 106 over Wi-Fi, WiMAX, a WAN (e.g., the Internet), and/or a suitable telecommunications network/protocol. As such, it should be appreciated that the illustrative cloud server 106 is located at one or more remote locations relative to the devices 102, 104, 108. In other embodiments, it should be appreciated that one or more of the communication connections may be wired.

In some embodiments, the access control system 100 may include the gateway device 110. For example, in some embodiments, the gateway device 110 may be used in conjunction with third-party integrations with the access control system 100. In some embodiments, a registered gateway device 110 may be treated as an additional owner of the secure container 102 with privileges similar to the owner. As such, unlike handlers or guests, the gateway device 110 may receive a cryptographic bearer token that is not time-limited and/or permission-limited in some embodiments. In embodiments that include the gateway device 110, it should be appreciated that the gateway device 110 may communicate with other devices of the access control system 100 over any suitable wired or wireless communication network and associated protocol. More specifically, in some embodiments, the gateway device 110 may establish real-time communication with the cloud server 106 (e.g., via IP) and the secure container 102 (e.g., via Wi-Fi). Further, in some embodiments, the secure container 102 may itself serve as a gateway for other smart home devices (e.g., door locks, cameras, etc.).

It should be appreciated that each of the owner device 104, the cloud server 106, the handler device 108, the gateway device 110, and/or the service cloud server 112 may be embodied as a computing device similar to the computing device 200 described below in reference to FIG. 2. For example, in the illustrative embodiment, each of the owner device 104, the cloud server 106, the handler device 108, the gateway device 110, and the service cloud server 112 includes a processing device 202 and a memory 206 having stored thereon operating logic 208 for execution by the processing device 202 for operation of the corresponding device. Additionally, it should be appreciated that a control system of the secure container 102 may include features similar to the features described below in reference to the computing device 200 of FIG. 2.

It should be further appreciated that, although the cloud server 106 and the service cloud server 112 are described herein as cloud-based devices or collections of devices, in other embodiments, each of the cloud server 106 and/or the service cloud server 112 may be embodied as one or more devices outside of a cloud computing environment. Further, in some embodiments, each of the cloud server 106 and/or the service cloud server 112 may be embodied as a "serverless" or server-ambiguous computing solution, for example, that executes a plurality of instructions on-demand, contains logic to execute instructions only when prompted by a particular activity/trigger, and does not consume computing resources when not in use. That is, the cloud server 106 and/or the service cloud server 112 may be embodied as a virtual computing environment residing "on" a computing system (e.g., a distributed network of devices) in which various virtual functions (e.g., Lamba functions, Azure functions, Google cloud functions, and/or other suitable virtual functions) may be executed corresponding with the functions of the cloud server 106 and/or the service cloud server 112 described herein. For example, when an event occurs (e.g., a user presses a button in an application to unlock the secure container 102), the application may contact the virtual computing environment (e.g., via an HTTPS request to an API of the virtual computing environment), whereby the API may route the request to the correct virtual function (e.g., a particular server-ambiguous computing resource) based on a set of rules. As such, when a request for a caveated cryptographic bearer token is made, the appropriate virtual function(s) may be executed to determine if that user should receive access to the secure container 102, mint the appropriate caveated cryptographic bearer token, and transmit that information back to the user before eliminating the instance of the virtual function(s). In some embodiments, it should be appreciated that the cloud server 106 may be embodied as multiple servers in a cloud computing environment. Accordingly, in such embodiments, the access control list 118 and/or other data used by the access control system 100 may be distributed among multiple servers.

Although only one secure container 102, one owner device 104, one cloud server 106, one handler device 108, one gateway device 110, and one service cloud server 112 are shown in the illustrative embodiment of FIG. 1, the access control system 100 may include multiple secure containers 102, owner devices 104, cloud servers 106, handler devices 108, gateway devices 110, and/or service cloud server 112 in other embodiments. For example, as described herein, a particular owner may have multiple owner devices 104 that the owner may use to securely connect with the cloud server 106 (e.g., via secure login over a security domain separate from the cryptographic bearer tokens) in order to register a secure container 102 and/or invite/revoke access control permissions of a particular handler/guest for the secure container 102. Similarly, a handler with permission to access/control a particular secure container 102 may securely connect with the cloud server 106 via any suitable handler device 108 to request and receive a caveated cryptographic bearer token for access to the secure container 102. Further, in some embodiments, a particular owner and/or handler may have access to multiple secure containers 102.

Figure 2:
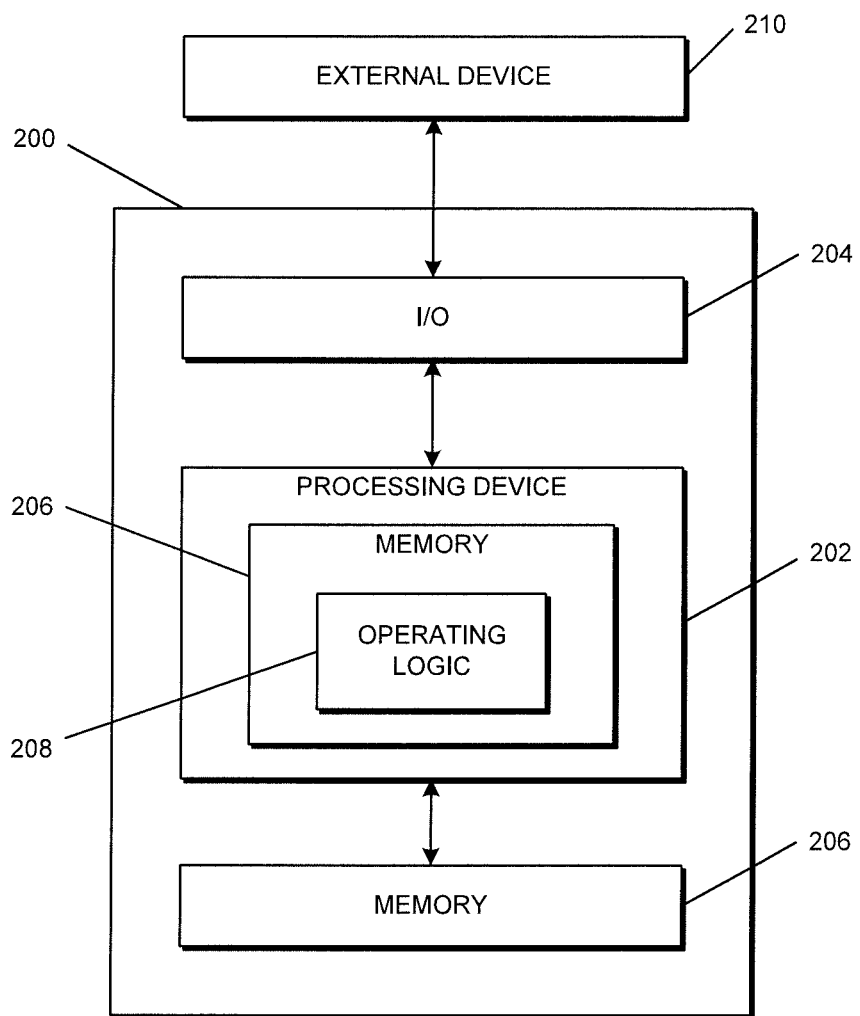
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of an owner device, cloud server, handler device, gateway device, and/or service cloud server that may be utilized in connection with the owner device 104, the cloud server 106, the handler device 108, the gateway device 110, and/or the service cloud server 112 illustrated in FIG. 1. Depending on the particular embodiment, the computing device 200 may be embodied as a reader device, credential device, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the secure container 102, the owner device 104, the cloud server 106, the handler device 108, the gateway device 110, and/or the service cloud server 112. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
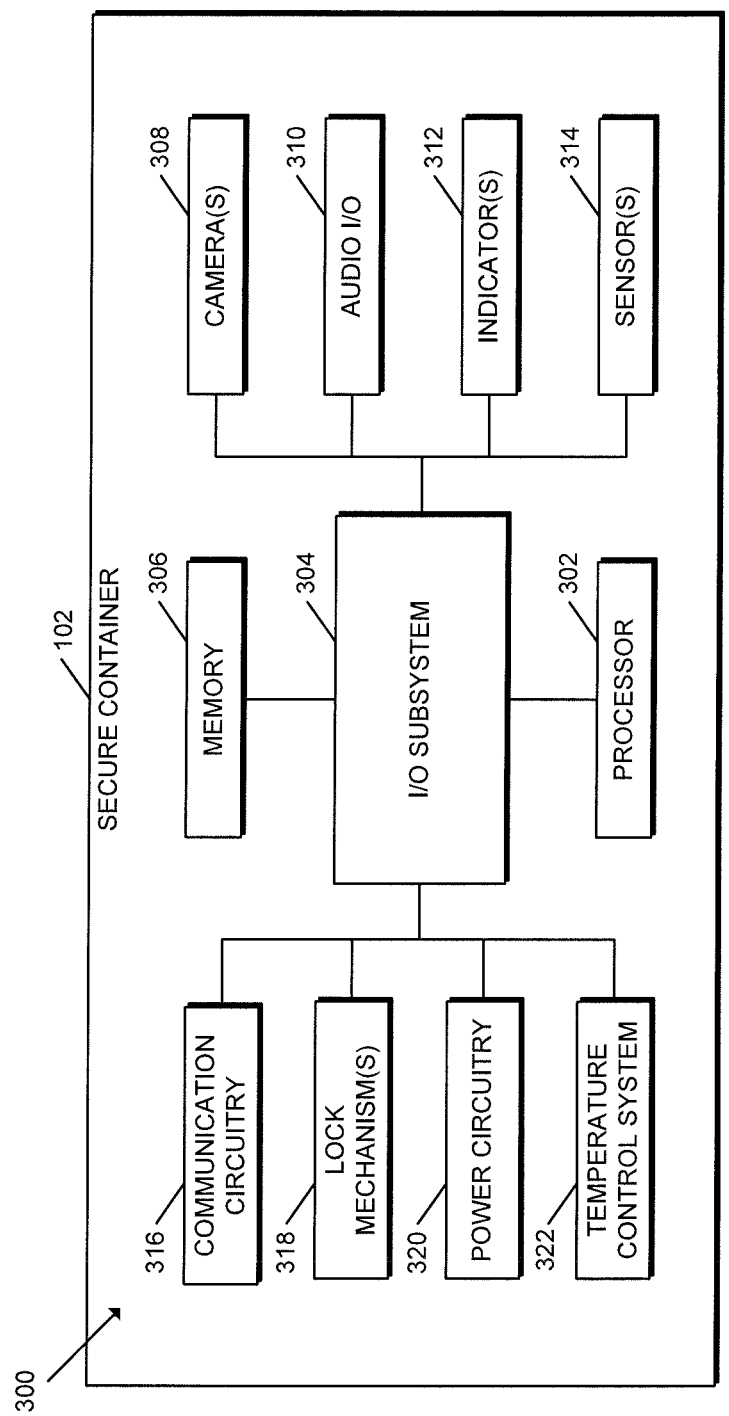
FIG. 3 is a simplified block diagram of at least one embodiment of a control system of the secure container of FIG. 1.

Referring now to FIG. 3, a simplified block diagram of at least one embodiment of a control system 300 of the secure container 102 is shown. The illustrative control system 300 includes a processor 302, an input/output ("I/O") subsystem 304, a memory 306, one or more cameras 308, one or more audio I/O devices 310, one or more indicators 312, one or more sensors 314, communication circuitry 316, one or more lock mechanisms 318, a power block or power circuitry 320, and a temperature control system 322. It should be appreciated that one or more of the components of the control system 300 described herein may be embodied as, or form a portion of, one or more embedded controllers and/or integrated circuits of the secure container 102. For example, in some embodiments, the processor 302, the I/O subsystem 304, the memory 306 and/or other components of the control system 300 may be embodied as, or form a portion of, a microcontroller or SoC. Further, depending on the particular embodiment, the components of the control system 300 may be closely positioned to one another or distributed throughout the secure container 102 (i.e., separated from one another). In some embodiments, one or more of the components of the control system 300 may be located external to a housing of the secure container 102. For example, in such embodiments, the component(s) of the control system 300 may be protected by a secure cover (e.g., a metal cover with a tamper sensor and/or tamper protection mechanism) with a window that allows for RF communications. Further, in some embodiments, a portion of the control system 300 may be incorporated into a wall of the housing of the secure container 102 (e.g., to protect the component(s) from exposure to the elements and exposure to potentially extreme temperatures in the temperature-controlled interior chamber of the secure container housing). Additionally, the control system 300 itself and/or one or more of the components of the control system 300 may be modular/replaceable (e.g., the hardware/firmware may be replaced without changing the lock mechanism 318).

The processor 302 may be embodied as any type of processor(s) capable of performing the functions described herein. In particular, the processor 302 may be embodied as one or more single or multi-core processors, microcontrollers, or other processor or processing/controlling circuits. For example, in some embodiments, the processor 302 may include or be embodied as an arithmetic logic unit (ALU), central processing unit (CPU), digital signal processor (DSP), and/or another suitable processor(s). The processor 302 may be a programmable type, a dedicated hardwired state machine, or a combination thereof. Processors 302 with multiple processing units may utilize distributed, pipelined, and/or parallel processing in various embodiments. Further, the processor 302 may be dedicated to performance of just the operations described herein, or may be utilized in one or more additional applications. In the illustrative embodiment, the processor 302 is of a programmable variety that executes algorithms and/or processes data in accordance with operating logic as defined by programming instructions (such as software or firmware) stored in the memory 306. Additionally or alternatively, the operating logic for the processor 302 may be at least partially defined by hardwired logic or other hardware. Further, the processor 302 may include one or more components of any type suitable to process the signals received from input/output devices or from other components or devices and to provide desired output signals. Such components may include digital circuitry, analog circuitry, or a combination thereof.

The memory 306 may be of one or more types of non-transitory computer-readable media, such as a solid-state memory, electromagnetic memory, optical memory, or a combination thereof. Furthermore, the memory 306 may be volatile and/or nonvolatile and, in some embodiments, some or all of the memory 306 may be of a portable variety, such as a disk, tape, memory stick, cartridge, and/or other suitable portable memory. In operation, the memory 306 may store various data and software used during operation of the control system 300 such as operating systems (e.g., real-time operating systems (RTOS)), applications, programs, libraries, and drivers. The memory 306 is communicatively coupled to the processor 302 via the I/O subsystem 304, which may be embodied as circuitry and/or components to facilitate input/output operations with the processor 302, the memory 306, and other components of the control system 300. For example, the I/O subsystem 304 may be embodied as, or otherwise include, memory controller hubs, input/output control hubs, firmware devices, communication links (i.e., point-to-point links, bus links, wires, cables, light guides, printed circuit board traces, etc.)

and/or other components and subsystems to facilitate the input/output operations. Depending on the particular embodiment, the memory 306 may be included with the processor 302 and/or coupled to the processor 302 depending on the particular embodiment. For example, in some embodiments, the processor 302, the I/O subsystem 304, the memory 306, and/or other components of the control system 300 may form a portion of a system-on-a-chip (SoC) and be incorporated on a single integrated circuit chip.

Each of the cameras 308 may be embodied as any type of device capable of capturing one or images discretely or in a stream. For example, the cameras 308 may include one or more two-dimensional (2D) cameras, three-dimensional (3D) cameras, and/or video cameras. It should be appreciated that the cameras 308 may be positioned in any suitable location(s) depending on the particular secure container 102 and the specific implementation. As such, depending on the particular embodiment, the cameras 308 may be secured to, integrated with, embedded within, and/or otherwise attached to the secure container 102. In some embodiments, the secure container 102 may include one or more cameras 308 positioned to capture the interior of the secure container 102 and/or the exterior of the secure container 102. As described below, in some embodiments, the cameras 308 may be configured to capture one or more images of the package handler as she is delivering a package, one or more images of the package itself, and/or other relevant images. Further, in some embodiments, rather than using the access tokens and/or unlock commands described herein, the access control system 100 may utilize a barcode, QR code, and/or other unique identifier that may be captured by the one or more cameras 308 and processed by the processor 302 (or processed remotely by the gateway device 110 or the cloud server 106) to determine whether the handler should be permitted access to the secure container 102. In other embodiments, the communication circuitry 316 may similarly read and process an RFID tag secured to the package to determine whether to authorize access to the secure container 102. In some embodiments, the cameras 308 may be configured to stream video of the secure container 102 and/or its environment to another device (e.g., the owner device 104).

Each of the audio I/O devices 310 may be embodied as any type of device capable of receiving audio input and/or emitting audio output. For example, the audio I/O devices 310 may include one or more microphones and/or speakers. It should be appreciated that the audio I/O devices 310 may be positioned in any suitable location(s) depending on the particular secure container 102 and the specific implementation. As such, depending on the particular embodiment, the cameras 308 may be secured to, integrated with, embedded within, and/or otherwise attached to the secure container 102. In some embodiments, audio may be received from the audio I/O devices 310 and communicated to another device and/or transmitted from the other device to the secure container 102 for emission via the audio I/O devices 310. For example, in some embodiments, the owner device 104 may communicate verbally with the package handler via a microphone and speaker of the secure container 102. Further, in some embodiments, the audio I/O devices 310 may be configured to generate an audible alarm (e.g., a siren or buzzer) in response to an alarm condition (e.g., a detected tamper condition).

The one or more indicators 312 may be embodied as any one or more devices or components configured to display a message to a user of the secure container 102. For example, in some embodiments, the indicator(s) 312 may be positioned on the exterior of the secure container 102 and configured to indicate to a person in the vicinity of the secure container 102 whether a package is within the secure container 102. Further, in some embodiments, one or more indicators 312 may be configured to indicate a status of the secure container 102 (e.g., power level, network connectivity, component failure, maintenance-related data, setup/configuration data, etc.). Further, in some embodiments, one or more of those statuses may be transmitted as notifications to the owner device 104, transmitted to the cloud server 106, and/or stored as audit data. In some embodiments, maintenance-related data/notifications may be transmitted, for example, to assist with repair diagnostics and/or to adapt performance parameters. Depending on the particular embodiment, the indicators 312 may emit as different patterns, shapes, and/or colors to convey different information. For example, the indicators 312 may be configured to display a different color indicating that a package has been delivered to the secure container 102 for each different delivery company. It should be further appreciated that the indicators 312 may be configured to generate a visible alarm in response to an alarm condition and/or automatically emit light when a person is nearby the secure container 102. In various embodiments, the indicator(s) 312 may be embodied as, or otherwise include, an e-ink display, LEDs, light pipes, LCDs, and/or other suitable visual indicator(s). In some embodiments, the indicator(s) 312 may be embodied as a mechanically-driven display system that includes two or more messages.

The sensors 314 are configured to generate sensor data (e.g., by virtue of one or more signals), which may be interpreted by the processor 302 to determine one or more characteristics associated with the secure container 102. By way of example, the sensors 314 may detect various characteristics of the physical environment of the secure container 102 (internal and/or external to the secure container 102), electrical characteristics of the secure container 102, electromagnetic characteristics of the secure container 102 or its surroundings, and/or other suitable characteristics. For example, in various embodiments, the sensors 314 may be embodied as, or otherwise include, inertial sensors (e.g., accelerometers, gyroscopes, etc.), environmental sensors (e.g., air pressure sensors, humidity sensors, light sensors, etc.), proximity sensors, optical sensors, electromagnetic sensors (e.g., magnetometers), hall effect sensors, audio sensors (e.g., microphones), temperature sensors, motion sensor, piezoelectric sensors, cameras, micro switches, tamper sensors, barrier position sensors, latch sensors, and/or other types of sensors. It should be appreciated that, in some embodiments, additional and/or alternative sensors 314 other than those described above may be included in the control system 300. Of course, the control system 300 may also include components and/or devices configured to facilitate the use of the sensors 314. Data from the sensors 314 may be used by the secure container 102 or, more particularly, the processor 302 to determine various conditions associated with the secure container 102. For example, in some embodiments, the sensors 314 may determine whether a person is in the vicinity of the secure container 102. In particular, in some embodiments, a motion sensor may be used to determine when someone has approached the secure container 102, which may prompt activation/waking the camera(s) 308 to record the interaction of that person with the secure container 102. Further, in some embodiments, a barrier position sensor may be configured to determine whether a door or other movable barrier of the secure container 102 is in an open position or a closed position, and a latch sensor may be configured to determine whether a lock mechanism 318 is in a locked/latched or unlocked/unlatched position. In particular, in some embodiments, sensor data generated by the barrier position sensor and the latch sensor may be processed in combination to determine whether the secure container 102 is in a secure, locked state (e.g., the moveable barrier is closed and the lock mechanism 318 is locked).

The communication circuitry 316 may be embodied as any communication circuitry, transceiver, device, or collection thereof, capable of enabling communications between the secure container 102 and other remote devices (e.g., the owner device 104, the handler device 108, the gateway device 110, and/or other remote devices). The communication circuitry 316 may be configured to use any one or more wired and/or wireless communication technologies and associated protocols. For example, in some embodiments, the illustrative secure container 102 may be configured to communicate via Wi-Fi (e.g., infrastructure or ad hoc mode), Wi-Fi Direct, Bluetooth (including Bluetooth Low Energy (BLE)), Zigbee, Z-wave, Near Field Communication (NFC), IEEE 802.15, and/or other suitable wireless communication protocol(s). Further, in some embodiments, the secure container 102 may be configured to communicate via Ethernet, Power over Ethernet (PoE), serial communication links, power line communication, and/or another suitable wired communication mechanism.

Each of the lock mechanisms 318 may be embodied as any type of device configured to control access. For example, in the illustrative embodiment, the secure container 102 includes a lock mechanism 318 that controls access via a door or other type of movable barrier to a chamber defined within the secure container 102. As such, the lock mechanism 318 may be configured to be positioned in a locked/latched state in which access to the chamber is denied (i.e., if the movable barrier is closed) and an unlocked/unlatched state in which access to the chamber is permitted. In some embodiments, the lock mechanism 318 includes a deadbolt, latch bolt, lever, and/or other mechanism adapted to move between the locked and unlocked state and otherwise perform the functions described herein. However, it should be appreciated that the lock mechanism 318 may be embodied as any another mechanism suitable for controlling access in other embodiments. It should be further appreciated that the secure container 102 may additionally include a lock mechanism 318 (e.g., an anchor lock) that may secure a chain, tether, and/or otherwise serve as an anchor point for the secure container 102 to prevent the secure container 102 from being moved from its proper position (e.g., the ground, the wall of a building, the tailgate of a vehicle, and/or another suitable position). In some embodiments, it should be appreciated that one or more of the lock mechanisms 318 may have a modular design such that it can be subsequently replaced. Further, in some embodiments, the control system 300 may include a relay connection to a motor output that is used to actuate a latch of the lock mechanism 318. However, it should be appreciated that the lock mechanism 318 may be otherwise actuated in other embodiments.

The power circuitry 320 is configured to convert power received from a power source, if necessary, into power usable by the control system 300 of the secure container 102. For example, in various embodiments, the power circuitry 320 may receive power from an AC mains power source (e.g., line power), one or more batteries or discrete power supplies, via a PoE interface, and/or from a power generator (e.g., a photovoltaic solar panel/array). In some embodiments, the power circuitry 320 may convert a portion of the power received from the power source into 3.3V power to supply various circuit components of the control system 300.

The temperature control system 322 may be embodied as any one or more components configured to heat and/or cool the chamber of the secure container 102 and otherwise perform the functions described herein. As described below, in some embodiments, the secure container 102 may be heated and/or cooled to a predefined temperature based on the particular package stored, or to be stored, in the secure container 102. For example, the temperature control system 322 may cool the secure container 102 to a temperature consistent with that of a freezer (e.g., zero degrees Fahrenheit) if the package stored is itself frozen to prevent the defrosting/refreezing and/or spoliation of the package (e.g., frozen meat). Likewise, the temperature control system 322 may heat the secure container 102 to a predefined temperature for a package that should be kept hot/warm. As such, it should be appreciated that the temperature control system 322 may include one or more heating elements and/or one or more cooling elements, and the secure container 102 may be insulated to facilitate maintaining a particular temperature. Further, in some embodiments, the secure container 102 may be hermetically sealed. In some embodiments, the temperature control system 322 may include one or more thermometers or other temperature sensors to determine the interior and/or exterior temperature of the secure container 102. In some embodiments, the sensor data generated by the temperature sensors may be processed by the processor 302, and the temperature control system 322 may be controlled by the processor 302 accordingly. Further, in some embodiments, the temperature control system 322 and/or components thereof may be modular in design, and/or positioned anywhere on the secure container 102.

It should be appreciated that the control system 300 may include additional or alternative components, such as those commonly found in an embedded control system, for example, in other embodiments. Further, in some embodiments, one or more of the components of the control system 300 described herein may be omitted from the control system 300 of a particular secure container 102.

Figure 4:
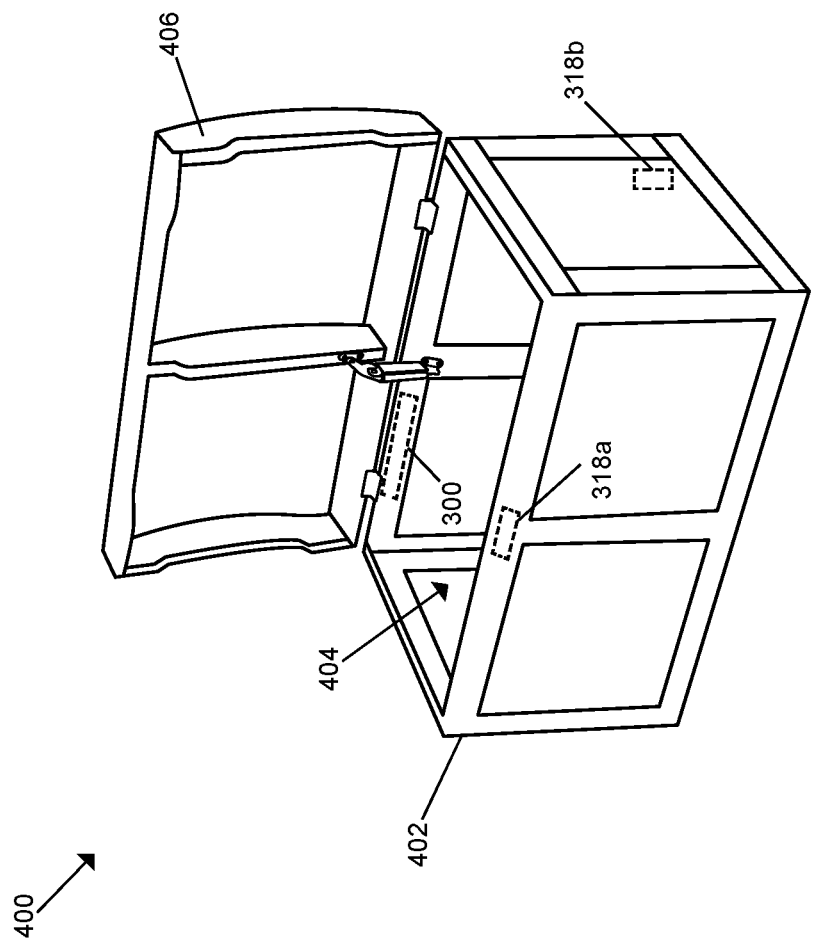
FIG. 4 is a perspective view of at least one embodiment of the secure container of FIG. 1 in an opened state.

It should be further appreciated that the secure container 102 may be embodied as any type of container having a chamber capable of storing one or more packages and a lock mechanism 318 to lock/secure the secure container 102, preventing unauthorized access thereto. For example, in various embodiments, the secure container 102 may be embodied as a standalone container, a container integrally formed with another common item (e.g., a piece of furniture), a container forming a portion of a building, and/or another type of secure container. In particular, in some embodiments, the secure container 102 may be embodied as a standalone container similar to the secure container 400 of FIG. 4. As shown, the secure container 400 includes a housing 402 having a chamber 404 defined therein for storage of a package. Although the secure container 400 is illustrated as a lock box having rectangular cross-section in FIG. 4 and, therefore, forming a hollow rectangular prism, it should be appreciated that the secure container 102 may have any other shape and cross-section(s) that permits the functions described herein. Additionally, the secure container 400 includes a movable barrier 406 secured to the housing 402 and adapted to move between an open position (as depicted) to allow access to the chamber 404 and a closed position to prevent access to the chamber 404. Although the movable barrier 406 is illustrated as a door secured to the housing 402 by hinge mechanisms, it should be appreciated that the movable barrier 406 may be embodied as a door, window, and/or other suitable type of moveable barrier, which may be secured to the housing 402 by any suitable attachment mechanism(s). Further, in some embodiments, the secure container 102 may include multiple movable barriers. As shown in FIG. 4 and described herein, the secure container 400 includes a lock mechanism 318a to secure the moveable barrier 406 to the housing 402 in a closed, locked state. Further, the secure container 400 may include another lock mechanism 318b for anchoring the secure container 400 to a suitable anchor point (e.g., a wall, ground, floor, vehicle, etc.).

Figure 5:
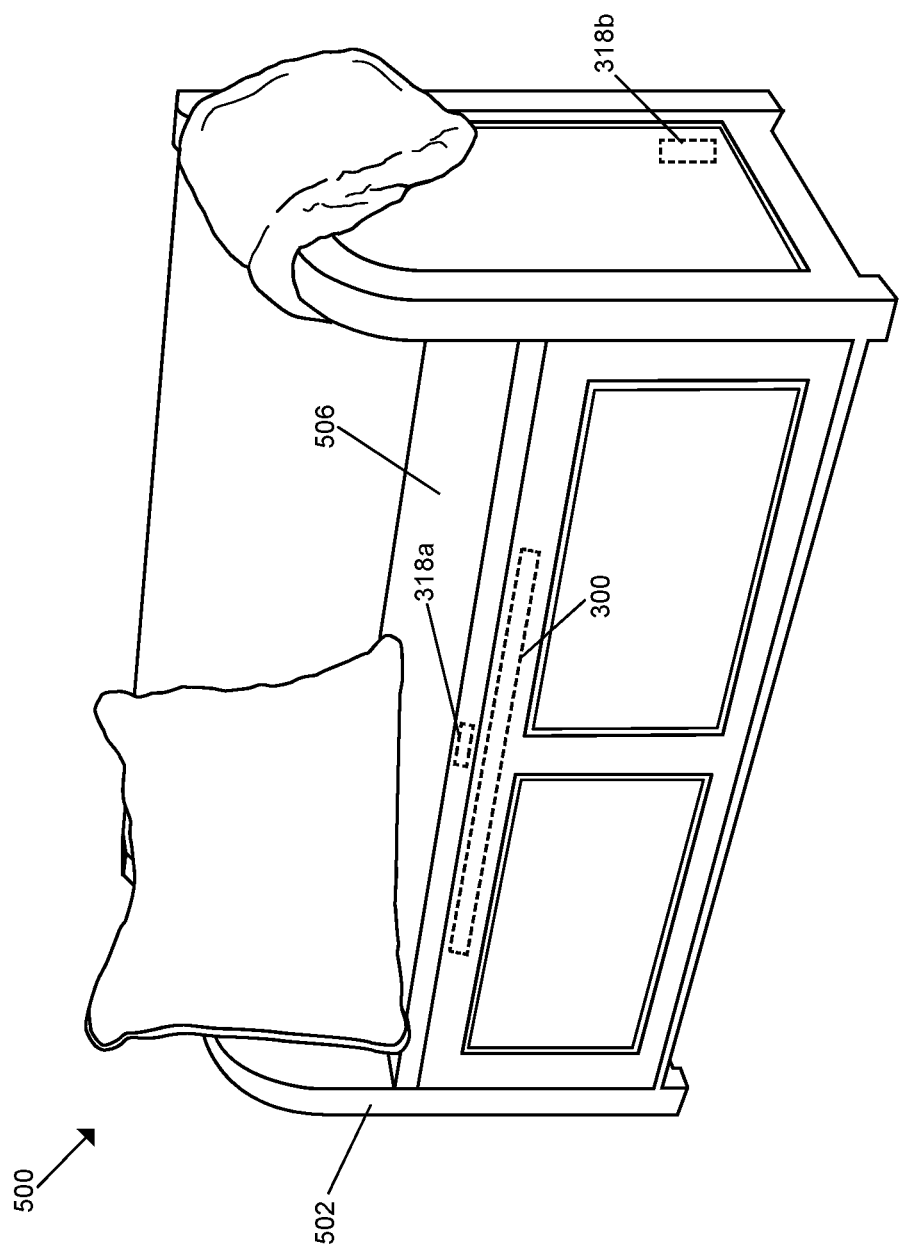
FIG. 5 is a perspective view of at least one other embodiment of the secure container of FIG. 1 in a closed state.
Figure 6:
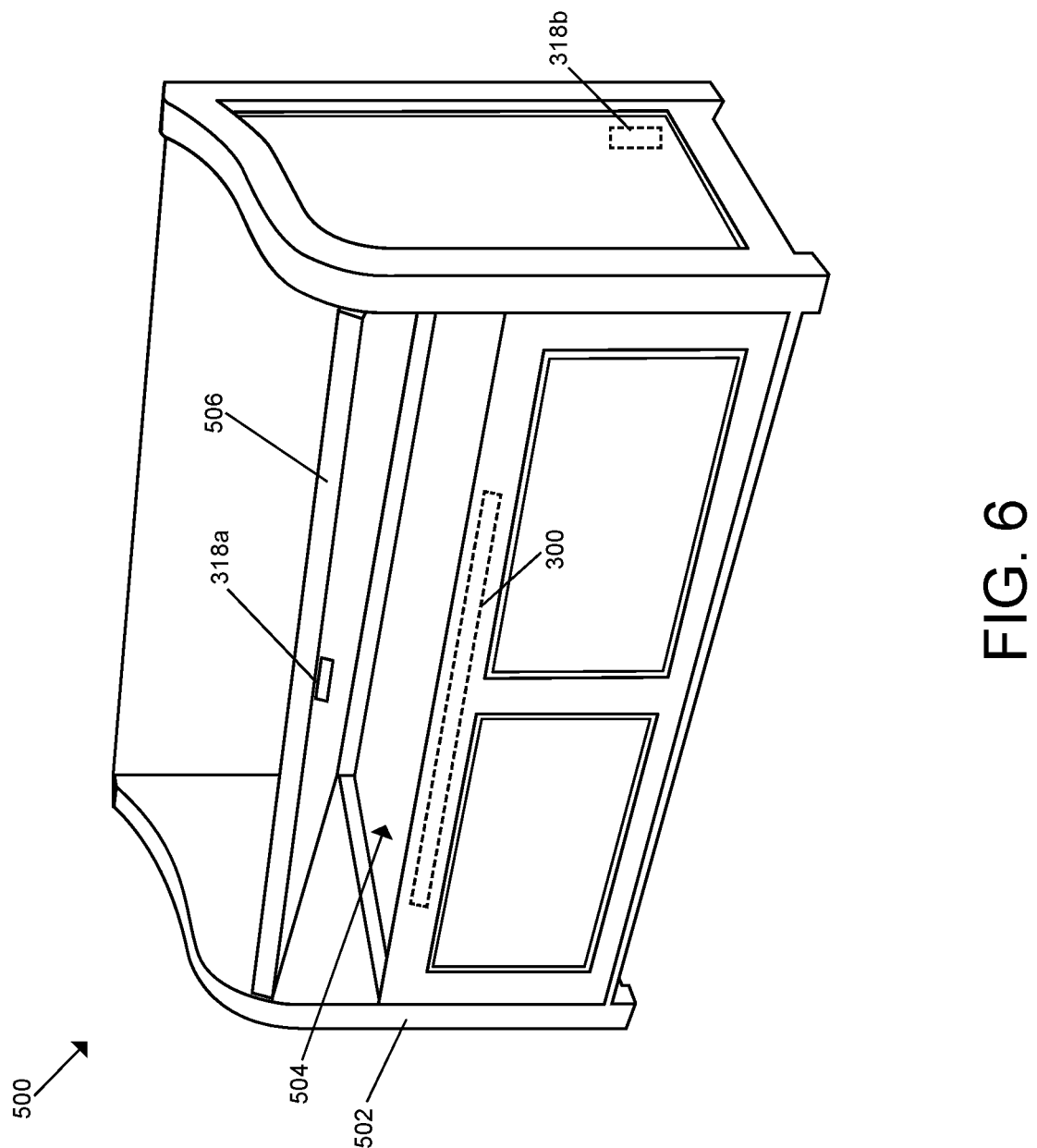
FIG. 6 is a perspective view of the secure container of FIG. 5 in an opened state.

In other embodiments, it should be appreciated that the secure container 102 may be incorporated into, integrated with, or form a portion of a piece of furniture or other object(s), which may provide improved aesthetics and/or stealth. Indeed, passersby may not even recognize the secure container 102 as being distinguishable from a traditional piece of furniture or other decorative or functional object (e.g., landscaping art). More specifically, in some embodiments, the secure container 102 may form a portion of a piece of furniture similar to the secure container 500 of FIGS. 5-6. Similar to the secure container 400 of FIG. 4, the secure container 500 of FIGS. 5-6 includes a housing 502 having a chamber 504 defined therein for storage of a package. Although the secure container 102 is illustrated as a bench in FIGS. 5-6, it should be appreciated that the secure container 102 may be incorporated into, integrated with, or form a portion of another type of furniture and/or other object(s) in other embodiments. Additionally, the secure container 500 includes a movable barrier 506 secured to the housing 502 and adapted to move between an open position (as depicted in FIG. 6) to allow access to the chamber 504 and a closed position (as depicted in FIG. 5) to prevent access to the chamber 504. Although the movable barrier 506 is illustrated as a door secured to the housing 502 by hinge mechanisms, it should be appreciated that the movable barrier 506 may be embodied as a door, window, and/or other suitable type of moveable barrier, which may be secured to the housing 502 by any suitable attachment mechanism(s). As shown in FIGS. 5-6 and described herein, the secure container 500 includes a lock mechanism 318a to secure the moveable barrier 506 to the housing 502 in a closed, locked state. Further, the secure container 500 may include another lock mechanism 318b for anchoring the secure container 500 to a suitable anchor point (e.g., a wall, ground, floor, etc.).

In some embodiments, it should be appreciated that the secure container 102 may be partially buried, which may provide improved aesthetics and/or temperature control. Additionally, in some embodiments, the secure container 102 may include one or more convenience features and/or one or more additional security features. For example, the secure container 102 may include a release handle on the interior of the chamber to allow an individual (e.g., a child) trapped inside the locked secure container 102 to free themselves. Further, the secure container 102 may include a drain (e.g., at the bottom) and have an interior composed of one or more materials conducive to cleaning. Additionally, in some embodiments, the secure container 102 may have a handle (e.g., a mechanically or electronically retractable handle) secured to the movable barrier of the secure container 102 to assist the package handler and owner in opening the movable barrier to access the chamber.

Although the secure container 102 is primarily described herein as being an individual container, it should be appreciated that the secure container 102 may be include multiple containers in other embodiments. Depending on the particular embodiment, each of those secure containers 102 may have its own control system 300, or one or more control systems 300 and/or components thereof may be shared among the various containers. For example, in some embodiments, the secure container 102 may be embodied as an array of lockers in a multi-unit building. In such embodiments, the secure container 102 may include, for example, some units that are capable of being heated, some units that are capable of being cooled, and some units that are capable of being neither heated nor cooled. Further, the secure container 102 may utilize venting to control the various temperatures (e.g., using a single temperature control system 322). In multi-unit embodiments, it should be appreciated that each of the units may have one or more of the components and/or features described herein with regard to the secure container 102.

As described above, the access control system 100 may leverage cryptographic bearer tokens (e.g., macaroons) and/or other access tokens to permit secure access to the secure container 102 by the handler. Accordingly, in such embodiments, the access control system 100 may include a mechanism for registering secure containers 102 (e.g., when newly purchased) and associating them with the proper owners. To do so, in some embodiments, the access control system 100 may perform one or more of the techniques described in reference to FIG. 3 of U.S. patent application Ser. No. 15/656,641 filed on Jul. 21, 2017, the entirety of which is incorporated herein by reference. As such, it should be appreciated that, in the process of registering the owner/container, a base cryptographic bearer token (e.g., associated with the owner) may be generated and stored to the secure container 102 and the cloud server 106. Further, the access control list 118 of the cloud server 106 may be updated to identify the base cryptographic bearer token and ownership of the secure container 102 by the registered owner. In particular, the access control list 118 may be updated to associate the owner with the secure container 102 (e.g., by mapping the owner's UUID to a unique identifier of the secure container 102).

It should be further appreciated that the access control list 118 may be updated to update access control permissions for a particular secure container 102. For example, in some embodiments, an owner may indicate a desire to update the access permissions via an application 116 executing on an owner device 104 (e.g., by selecting a particular option on the application, by initiating a secure login, etc.). Once verified, the owner may invite a guest/handler to have access permissions to the secure container 102 or revoke a particular guest/handler's access permissions to a particular secure container 102. To do so, in some embodiments, the access control system 100 may perform one or more of the techniques described in reference to FIG. 4 of U.S. patent application Ser. No. 15/656,641. As described above, in some embodiments, the owner may provide access permissions to a particular handler entity, which may coordinate with the appropriate handler to ensure the access tokens are properly transmitted to the handler's handler device 108. As described above, in the illustrative embodiment, handlers (or handler entities) may be provided time-limited and permission-limited access relative to the owner, which may have full access control over the secure container 102 that is not time-bounded (or time-bounded with a greater time limit) or permission-limited. For example, in some embodiments, the handler is not given permission to unlock an anchor lock mechanism 318 on the secure container 102.

Having updated the access control list 118 to permit the guest/handler access to the secure container 102, the cloud server 106 may subsequently issue temporary tokens (e.g., caveated cryptographic bearer tokens) to be given to the guest/handler for access to the secure container 102 as described herein. In some embodiments, it should be appreciated that the temporary token may provide schedule-based access to the handler/guest. For example, the token may include a modified and/or additional time-based caveat that sets a time at which the token becomes valid, thereby providing a window within which the temporary token may be used (e.g., between the time at which it becomes valid and the time at which it expires). It should be appreciated that the techniques described herein allow the owner to update the access control list 118 that defines access permissions for the secure container 102 without interacting with the secure container 102 for which access permission are being modified.

Figure 7:
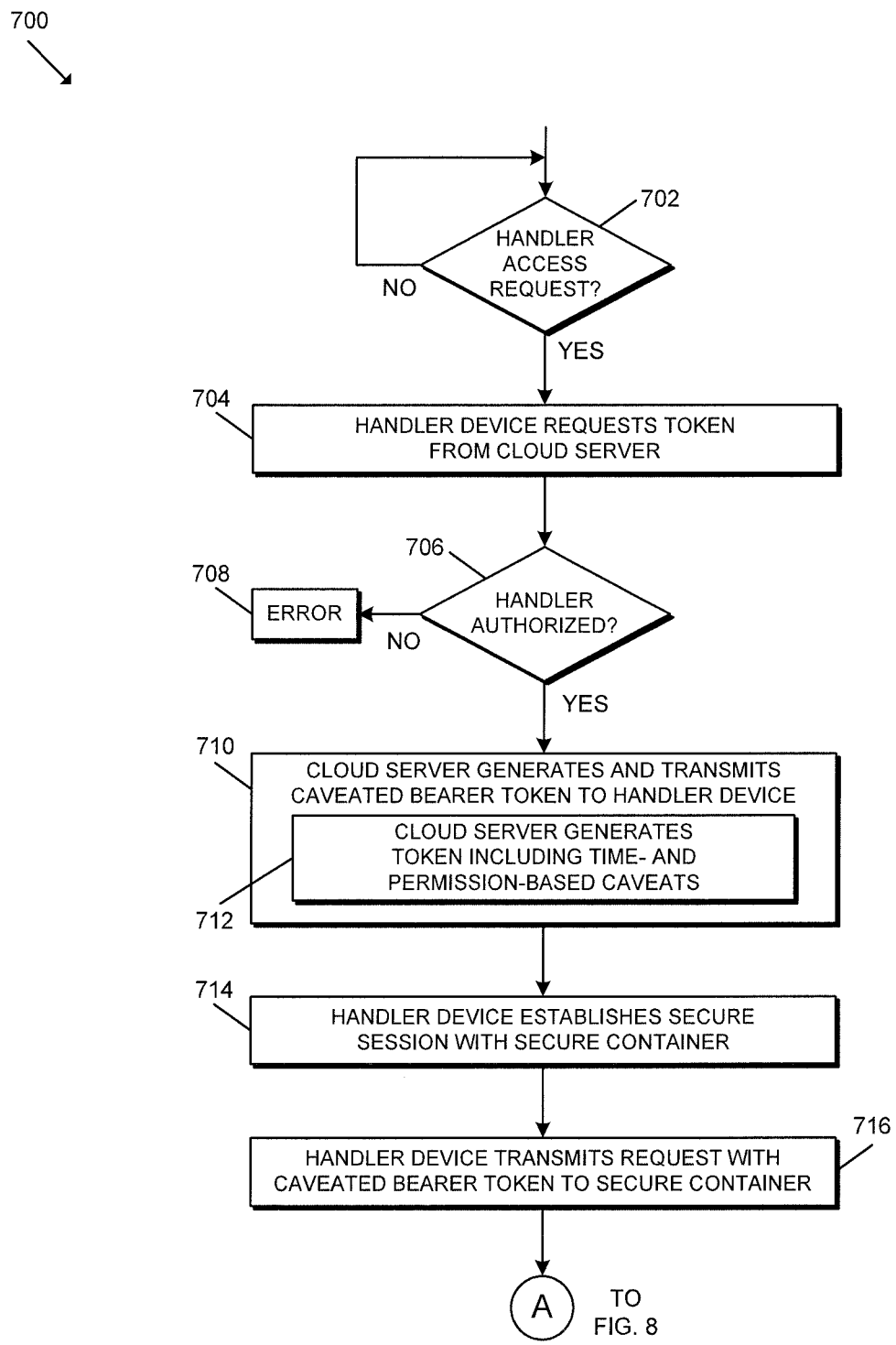
FIGS. 7 and 8 are a simplified flow diagram of at least one embodiment of a method for accessing a secure container using a handler device.
Figure 8:
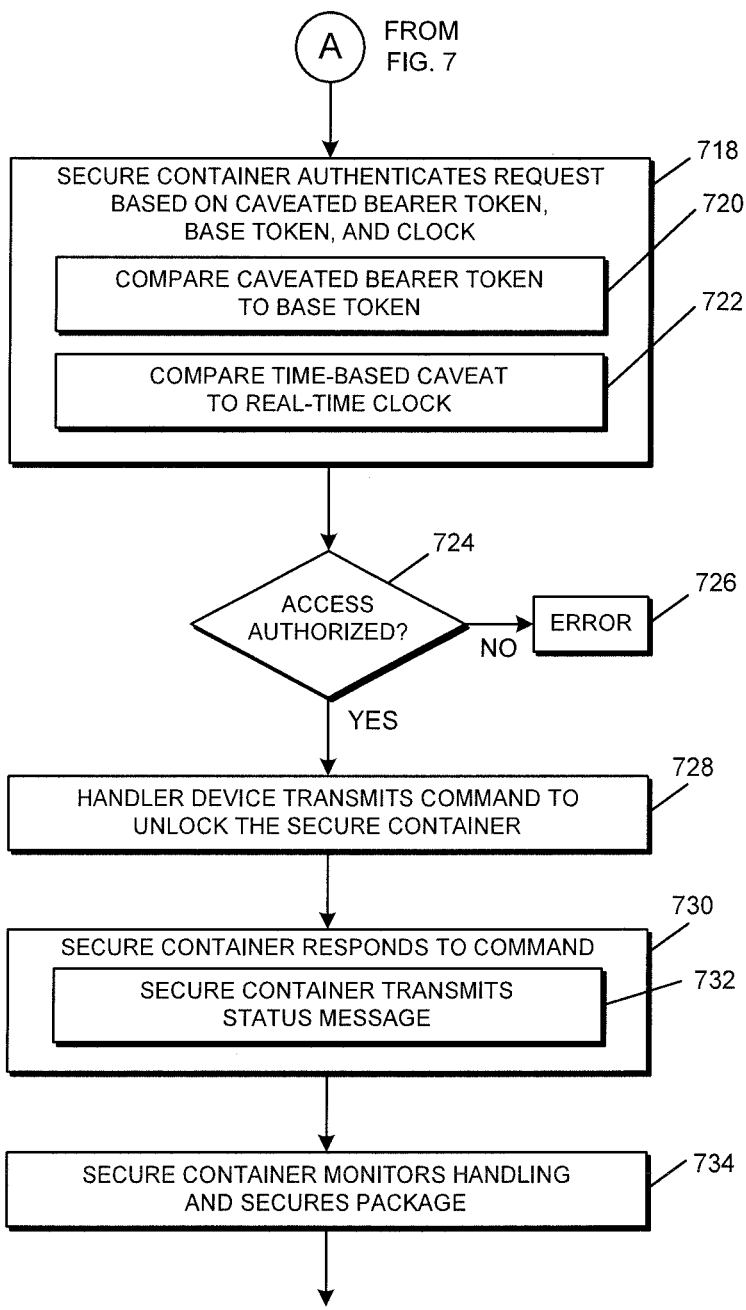

Referring now to FIGS. 7-8, in use, the access control system 100 may execute a method 700 for accessing a secure container 102 using a handler device 108. It should be appreciated that the particular blocks of the method 700 are illustrated by way of example, and such blocks may be combined or divided, added or removed, and/or reordered in whole or in part depending on the particular embodiment, unless stated to the contrary. The illustrative method 700 begins with block 702 in which the cloud server 106 determines whether a handler is requesting access permissions to a particular secure container 102 (e.g., when the package handler arrives at the delivery site). For example, in some embodiments, the handler may request access to the secure container 102 via the application 116 on the handler device 108. In particular, in some embodiments, the application 116 may include a graphical user interface that identifies each of the secure containers 102 for which the handler has access permissions. As described above, in some embodiments, the handler may request access to the secure container 102 through the service cloud server 112 and a cloud-to-cloud interface between the service cloud server 112 and the cloud server 106.

Upon identifying the particular secure container 102 for which access is desired, in block 704, the handler device 108 requests a caveated cryptographic bearer token (or other access token/credential) from the cloud server 106. In block 706, the cloud server 106 determines whether the handler using the handler device 108 is authorized to access the secure container 102 based on the access control list 118 stored in the cloud server 106. For example, the handler may be required to securely login to the cloud server 106 or associated cloud service through a security domain separate from the token-based security in order to prove the handler's identity. Further, the cloud server 106 may compare the handler's identity (e.g., via a handler UUID generated during the secure login) to the access control list 118 to confirm that the handler identifier is associated with the secure container 102 that the handler desires to access. If the handler's identity cannot be verified by secure login and/or the handler identifier is not associated with access to the secure container 102 in the access control list 118, the access control system 100 performs one or more error handling procedures in block 708. For example, in some embodiments, the cloud server 106 drops its communication connection with the handler device 108, alerts the owner/handler of the error, and/or records the error in an audit file. It should be appreciated, however, that the access control system 100 may, additionally or alternatively, perform other suitable error handling procedures. It should be further appreciated that the access control system 100 may utilize additional and/or alternative techniques to authorize the handler when a cloud-to-cloud interface is employed. For example, the handler may be prompted to prove her identity to the service cloud server 112, which may, in turn, perform a secure authentication with the cloud server 106.

Returning to block 706, if the cloud server 106 determines that the handler is authorized to access the secure container 102, the method 700 advances to block 710 in which the cloud server 106 generates a caveated cryptographic bearer token and transmits the generated token to the handler device 108. In particular, in block 712, the cloud server 106 may generate a caveated cryptographic bearer token including a time-based caveat that defines a time limit for control of the secure container 102 and a permission-based caveat that defines a permission level of the bearer of the token as described herein. In particular, in the illustrative embodiment, the cloud server 106 retrieves the base cryptographic bearer token associated with the secure container 102 and generates a caveated cryptographic bearer token based on that base cryptographic bearer token. In other embodiments, the cloud server 106 may, additionally or alternatively, include other caveats. Again, in some embodiments, such communications may be routed through the service cloud server 112.

As described above, it should be appreciated that the cryptographic bearer tokens described herein may include or be embodied as macaroons. It should be appreciated that a macaroon is a data structure that can have caveats appended to it, for example, to limit time access and privilege level of a user of a secure container 102. When the secure container 102 is paired with the owner device 104 (e.g., during a one-time action unless a factory default reset occurs to reset data on the secure container 102), the secure container 102 may generate a macaroon that is transmitted to the owner device 104 and forwarded to the cloud server 106. The macaroon may be composed of a security key and caveats associated with a macaroon type (e.g., owner, admin/manager, and user/guest/handler) and a timestamp indicating a creation time of the macaroon. Further, in some embodiments, the macaroon may include a caveat associated with a function of the macaroon (e.g., what the macaroon is intended to do). The security key may be based, for example, on a SPAKE key generated during the pairing between the secure container 102 and the owner device 104. In other embodiments, another suitable key may be used for the macaroon. The permitted values for the time-based caveat may vary depending on the particular embodiment. For example, in some embodiments, the time-based caveat may allow time/expiration limits of one hour, twenty-four hours, thirty days, or absolute/non-expiring. In other embodiments, any suitable time limits may be used. It should be appreciated that, in the illustrative embodiment, the time limits define the amount of time that may elapse from the generation of the macaroon (e.g., defined by a timestamp in the macaroon) before the macaroon is considered to be expired.

In some embodiments, the base macaroon, base, may be generated according to base={base_caveats|base_tag}, where base caveats is a concatenated string of the caveats of the base macaroon, base_tag=HMAC(key,base_caveats), and HMAC is a keyed-hash message authentication code of the base_caveats using key as the cryptographic key for the hash. As indicated above, it should be appreciated that any suitable keys may be used for the generation of the base macaroon. Further, as described herein, a macaroon may also be derived from the base macaroon (e.g., for transmittal to a handler device 108) thereby narrowing the permissions of the base macaroon (e.g., further including time-limiting and/or permission-limiting caveats). In particular, a derived macaroon, handler, may be generated according to handler=HMAC(base_tag, handler_caveats)=HMAC (HMAC(key,base_caveats),handler_caveats) where handler_caveats is a concatenated string of the additional caveats defining the handler's access permissions. It should be further appreciated that the macaroons may further incorporate caveats associated with a particular session and/or other suitable information.

Referring back to FIG. 7, in block 714, the handler device 108 establishes a secure communication session with the secure container 102 and, in block 716, the handler device 108 securely transmits a request to access the secure container 102 including the caveated cryptographic bearer token to the secure container 102. The method 700 advances to block 718 of FIG. 8 in which the secure container 102 authenticates the access request based on the received caveated cryptographic bearer token, the base cryptographic bearer token stored on the secure container 102, and the real-time clock of the secure container 102. In particular, in block 720, the secure container 102 compares the caveated cryptographic bearer token to the base cryptographic bearer token to determine whether the caveated cryptographic bearer token is associated with the base cryptographic bearer token. It should be appreciated that the tokens may be compared directly or indirectly depending on the particular embodiment. For example, in the illustrative embodiment, the secure container 102 determines whether caveated cryptographic bearer token was derived from the base cryptographic bearer token using a suitable technique or algorithm (e.g., using the appropriate keys and the HMAC as described above). Additionally, in block 722, the secure container 102 compares the time-based caveat to the real-time clock of the secure container 102 to determine whether the current time is within the time limit defined by the time-based caveat.

If the caveated cryptographic bearer token is not properly associated with the base cryptographic bearer token or the current time is outside the time period for access authorized by the time-based caveat, for example, the authentication fails and the handler device 108 is determined to be unauthorized to access the secure container 102. If the secure container 102 determines, in block 724, that the access is unauthorized, the access control system 100 performs one or more error handling procedures in block 726. For example, the access control system 100 may handle the error in a manner similar to that described above in reference to block 708. In particular, the secure container 102 may drop its communication connection with the handler device 108 and/or record the error in an audit file that may be subsequently retrieved (e.g., by an owner device 104). Further, the application 116 may alert the user of the handler device 108 of the error. Additionally, in some embodiments, the secure container 102 may emit an audible and/or visible alarm using the audio I/O devices 310 and/or the indicators 312. It should be appreciated, however, that the access control system 100 may, additionally or alternatively, perform other suitable error handling procedures.

However, if the access is authorized, the method 700 advances to block 728 in which the handler device 108 may transmit a command to control a function of the secure container 102. In particular, in some embodiments, the handler device 108 may transmit a command to the secure container 102 to unlock a lock mechanism 318 of the secure container 102 to allow the handler access to the chamber for placement of the package. In other embodiments, however, it should be appreciated that the command to unlock the lock mechanism 318 may be implicit such that the transmittal of the access token to the secure container 102 constitutes a request to unlock the lock mechanism 318 and, if authorized, the secure container 102 may automatically unlock the lock mechanism 318. Further, in block 732, in some embodiments, the secure container 102 may transmit a status message to the handler device 108 based on the success or failure of the requested access. For example, if the handler has delayed issuing an unlock command such that the time limit defined by the time-based caveat is no longer satisfied, the access attempt may be denied by the secure container 102.

In block 734, the secure container 102 may monitor the handling of the package and secure/lock the package in the chamber defined in the housing of the secure container 102. To do so, the access control system 100 or, more specifically, the secure container 102 may execute a method 900 of FIG. 9 described below.

It should be appreciated that the owner may utilize an owner device 104 to retrieve an owner-level contextual cryptographic bearer token for access to a secure container 102 of the owner in a manner similar to that described above in reference to a handler obtaining a token. However, in some embodiments, the owner's token generated by the cloud server 106 does not include a time-based caveat or may be less time-bounded than the handler's token. In other embodiments, the owner may retrieve and use the base cryptographic bearer token for access to the secure container 102. In yet other embodiments, the owner's token may be stored on the owner device 104 such that it is unnecessary to retrieve the token from the cloud server 106 for access to the secure container 102. Further, although the techniques are described herein in reference to cryptographic bearer tokens, it should be appreciated that similar access control measures may be employed using different access tokens based on the techniques described herein.

Although the blocks 702-734 are described in a relatively serial manner, it should be appreciated that various blocks of the method 700 may be performed in parallel in some embodiments.

Figure 9:
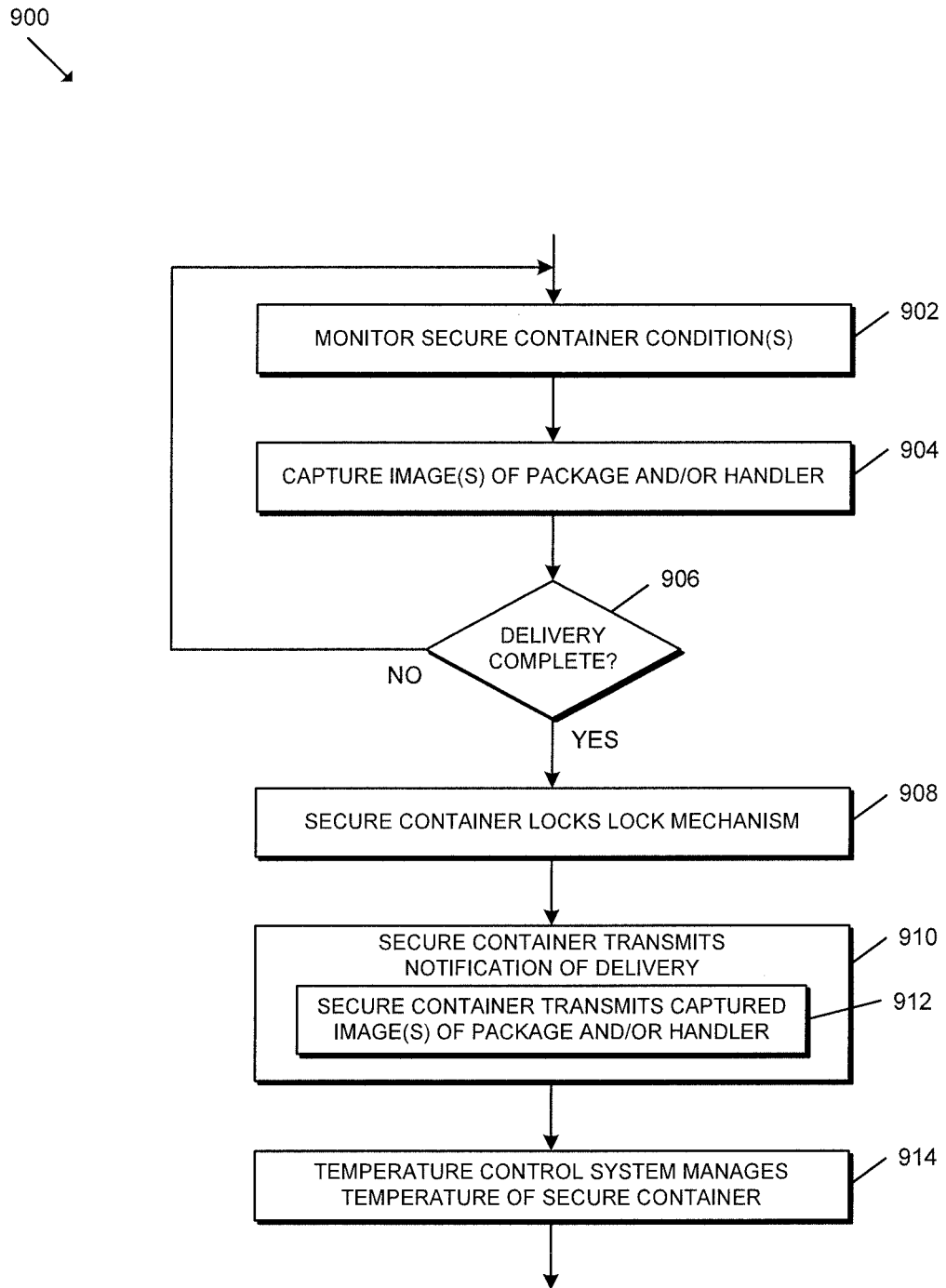
FIG. 9 is a simplified flow diagram of at least one embodiment of a method for monitoring the handling of and securing a package.

Referring now to FIG. 9, in use, the access control system 100 or, more specifically, the secure container 102 may execute a method 900 for monitoring the handling of and securing a package. It should be appreciated that the particular blocks of the method 900 are illustrated by way of example, and such blocks may be combined or divided, added or removed, and/or reordered in whole or in part depending on the particular embodiment, unless stated to the contrary. The illustrative method 900 begins with block 902 in which the secure container 102 monitors for various predefined conditions based on data generated by the cameras 308, the audio I/O devices 310, the indicators 312, the sensors 314, the communication circuitry 316, the lock mechanism(s) 318, the power circuitry 320, the temperature control system 322, and/or other components of the control system 300 of the secure container 102. For example, in some embodiments, the secure container 102 may monitor the open/closed status of the movable barrier, the locked/unlocked status of the lock mechanism 318, the presence/absence of a person (e.g., the handler) in the vicinity of the secure container 102, the environmental characteristics of the secure container 102, and/or other conditions/characteristics.

In block 904, the secure container 102 may capture one or more images (e.g., still shots and/or video) of the package handler and/or the package being delivered. In particular, in some embodiments, the secure container 102 may use a motion sensor to activate/wake a camera 308 from a low power or sleep state in response to detection of a person in the vicinity of the secure container 102. In some embodiments, it should be appreciated that the delivery service associated with an anticipated package delivery may dictate whether one or more components of the secure container 102 are powered/activated before, during, and/or after delivery of the package. For example, a standard mail package may not prompt the temperature control system 322 to activate and regulate the temperature of the secure container 102 to a particular temperature (or temperature range), whereas the delivery of a frozen food item may prompt the temperature control system 322 to do so.

If the secure container 102 determines, in block 906, that the delivery is complete, the method 900 advances to block 908 in which the secure container 102 relocks the lock mechanism 318 to maintain the movable barrier in the closed position and secure the package. In block 910, the secure container 102 may transmit a notification of the delivery to the owner device 104, the cloud server 106, the service cloud server 112, and/or another suitable device. Further, in block 912, the secure container 102 may transmit one or more images of the package and/or the handler captured during the delivery. Further, in some embodiments, the secure container 102 and/or the cloud server 106 may transmit a reminder notification to the owner if the package has not been removed from the secure container 102 after a threshold period of time has lapsed.

In block 914, the temperature control system 322 of the secure container 102 may manage the temperature of the secure container 102 based, for example, on the package stored therein. In some embodiments, the secure container 102 may receive a command from the owner device 104, the handler device 108, the gateway device 110, and/or another suitable device indicating that a package is going to be delivered according to a particular time schedule and to heat and/or cool the secure container 102 based on that schedule. Further, in some embodiments, the secure container 102 may determine an appropriate temperature for the secure container 102 based on the package being delivered and past experiences. For example, if the secure container 102 was heated to two hundred degrees for the last several deliveries of a particular item, the secure container 102 may again heat the secure container 102 to two hundred degrees when that package is subsequently delivered. It should be appreciated that the secure container 102 may leverage one or more pattern recognition or machine learning algorithms (e.g., artificial neural networks) to make accurate predictions in some embodiments. Further, in some embodiments, the secure container 102 may account for the external temperature of the environment surrounding the secure container 102 in determine whether to regulate the temperature of the secure container 102 and, if so, the temperature at which to maintain the secure container 102. In some embodiments, the temperature control system 322 may be configured to turn off when the movable barrier is in an open position, for example, to avoid wasted energy. Additionally, in some embodiments, the owner device 104 and/or other authorized device may be capable of remotely controlling the temperature of the secure container 102 (e.g., implicitly, based on a caveated cryptographic bearer having a corresponding caveat for that function, or otherwise).

Although the blocks 902-914 are described in a relatively serial manner, it should be appreciated that various blocks of the method 900 may be performed in parallel in some embodiments.

Figure 10:
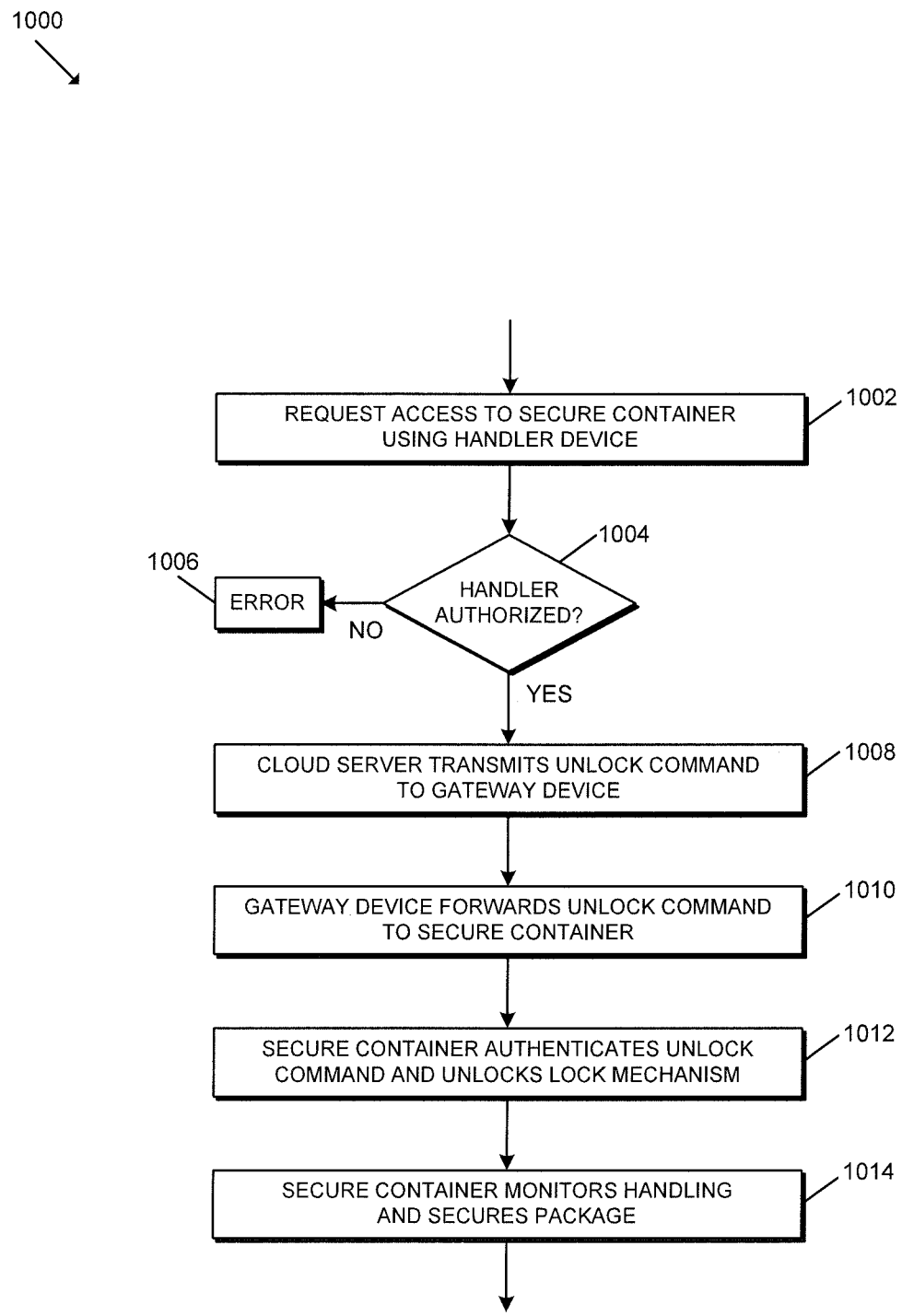
FIG. 10 is a simplified flow diagram of at least one other embodiment of a method for accessing a secure container using a handler device.

Referring now to FIG. 10, in use, the access control system 100 may execute another method 1000 for accessing a secure container 102 using a handler device 108 (e.g., using the gateway device 110). It should be appreciated that the particular blocks of the method 1000 are illustrated by way of example, and such blocks may be combined or divided, added or removed, and/or reordered in whole or in part depending on the particular embodiment, unless stated to the contrary. The illustrative method 1000 begins with block 1002 in which the package handler requests access to the secure container 102 using the handler device 108. For example, in some embodiments, the handler device 108 may transmit the request to the cloud server 106 in a manner similar to that described in reference to the method 700 of FIG. 7.

In block 1004, the cloud server 106 determines whether the handler using the handler device 108 is authorized to access the secure container 102 based, for example, on the access control list 118 stored in the cloud server 106. If not, the method 1000 advances to block 1006 in which the access control system 100 performs one or more error handling procedures. For example, the cloud server 106 may drop its communication connection with the handler device 108, alert the owner/handler of the error, record the error in an audit file, and/or perform other suitable error handling procedures. As described above, it should also be appreciated that the handler may request access and be authorized via the service cloud server 112 in some embodiments. Returning to block 1004, if the cloud server 106 determines that the handler is authorized to access the secure container 102, the method 1000 advances to block 1008 in which the cloud server 106 transmits an unlock command to the gateway device 110. It should be appreciated that, in some embodiments, the unlock command may include, form a portion of, or be embodied as a caveated cryptographic bearer token or other access token/credential. In block 1010, the gateway device 110 forwards the unlock command to the secure container 102 and, in block 1012, the secure container authenticates the unlock command and, if authenticated, unlocks the lock mechanism 318 to permit the handler to access the chamber of the secure container 102 for secure placement of the package therein. Further, in block 1014, the secure container 102 may monitor the handling of the package and secure/lock the package in the chamber defined in the housing of the secure container 102 according, for example, to the method 900 of FIG. 9 described above.

Although the blocks 1002-1014 are described in a relatively serial manner, it should be appreciated that various blocks of the method 1000 may be performed in parallel in some embodiments.

What is claimed is:

1. A method, comprising:
   transmitting, by a handler device associated with a package handler, a message to an access control system requesting access to a secure container secured by an electronic lock mechanism;
   determining, by the access control system, whether the package handler is authorized to access the secure container based on the received message;
   transmitting, by the access control system, an unlock command to the secure container in response to a determination that the package handler is authorized to access the secure container, wherein the unlock command comprises a caveated cryptographic bearer token that includes a time-based caveat defining a time limit for accessing the secure container; and unlocking the electronic lock mechanism of the secure container in response to successful authentication of the unlock command.

2. The method of claim 1, wherein transmitting the unlock command from the access control system to the secure container comprises:
   transmitting the unlock command from the access control system to a gateway device; and
   forwarding the unlock command by the gateway device to the secure container.

3. The method of claim 2, wherein forwarding the unlock command comprises transmitting the unlock command from the gateway device to the secure container over a Wi-Fi communication connection established between the gateway device and the secure container.

4. The method of claim 1, wherein the caveated cryptographic bearer token comprises a macaroon.

5. The method of claim 1, further comprising locking the electronic lock mechanism of the secure container in response to a determination that a package has been placed in the secure container.

6. The method of claim 5, further comprising capturing an image of at least one of the package or the package handler with a camera of the secure container.

7. The method of claim 5, further comprising regulating a temperature of the secure container based on the type of package placed in the secure container.

8. The method of claim 5, further comprising transmitting, by the secure container, a notification message to an owner device indicating that the package has been delivered in response to the determination that the package has been placed in the secure container.

9. An access control system, comprising:
   a secure container including:
      a housing having a chamber defined therein for storage of a package;
      a movable barrier secured to the housing and adapted to move between an open position to allow access to the chamber and a closed position to prevent access to the chamber;
      an electronic lock mechanism adapted to move between a locked position and an unlocked position; and
      a control system; and
   a server including a first processor and a first memory comprising a first plurality of instructions stored thereon that, in response to execution by the first processor, causes the server to (i) receive a message from a handler device associated with a package handler requesting access to the chamber of the secure container and (ii) transmit an unlock command to the secure container in response to a determination that the package handler is authorized to access the chamber of the secure container, wherein the unlock command comprises a caveated cryptographic bearer token that includes a time-based caveat defining a time limit for accessing the secure container; and
   wherein the secure container is configured to transmit a control signal from the control system to the electronic lock mechanism to unlock the electronic lock mechanism to allow movement of the movable barrier from the closed position to the open position in response to successful authentication of the unlock command.

10. The access control system of claim 9, further comprising a gateway device including a second processor and a second memory; and
   wherein to transmit the unlock command to the secure container comprises to transmit the unlock command from the server to the gateway device; and
   wherein the second memory of the gateway device comprises a second plurality of instructions stored thereon that, in response to execution by the second processor, causes the gateway device to (i) receive the unlock command from the server and (ii) forward the unlock command to the secure container.

11. The access control system of claim 10, wherein the control system comprises a Wi-Fi communication circuitry; and
   wherein the gateway device is configured to forward the unlock command to the secure container over a Wi-Fi communication connection established between the gateway device and the secure container.

12. The access control system of claim 9, wherein the secure container is configured to transmit a control signal from the control system to the electronic lock mechanism to lock the electronic lock mechanism of the secure container in response to a determination that a package has been placed in the chamber of the secure container and the movable barrier is in the closed position.

13. The access control system of claim 12, further comprising a camera system configured to capture an image of at least one of the package or the package handler.

14. The access control system of claim 12, wherein the secure container further comprises a temperature control system configured to regulate a temperature of the chamber of the secure container based on the type of package placed in the chamber.

15. The access control system of claim 12, wherein the control system of the secure container comprises a wireless communication circuitry configured to transmit a notification message to an owner device indicating that the package has been delivered in response to the determination that the package has been placed in the chamber of the secure container.

16. The access control system of claim 9, wherein the control system of the secure container comprises a power circuitry configured to receive AC mains power.

17. The access control system of claim 9, wherein the caveated cryptographic bearer token comprises a macaroon.

18. The access control system of claim 9, wherein the control system of the secure container comprises a power circuitry that includes a photovoltaic solar panel that generates power.

19. An access control system, comprising:
   a secure container including:
      a housing having a chamber defined therein for storage of a package;
      a movable barrier secured to the housing and adapted to move between an open position to allow access to the chamber and a closed position to prevent access to the chamber;
      an electronic lock mechanism adapted to move between a locked position and an unlocked position; and
      a control system;
   a camera system configured to capture an image of at least one of the package or the package handler, wherein the camera system comprises a first camera positioned to capture images of an interior of the secure container and a second camera positioned to capture images exterior to the secure container; and
   a server including a first processor and a first memory comprising a first plurality of instructions stored thereon that, in response to execution by the first processor, causes the server to (i) receive a message from a handler device associated with a package handler requesting access to the chamber of the secure container and (ii) transmit an unlock command to the secure container in response to a determination that the package handler is authorized to access the chamber of the secure container, wherein the unlock command includes time-based permission data defining a time limit for accessing the secure container;

wherein the secure container is configured to transmit a control signal from the control system to the electronic lock mechanism to unlock the electronic lock mechanism to allow movement of the movable barrier from the closed position to the open position in response to successful authentication of the unlock command; and wherein the secure container is configured to transmit a control signal from the control system to the electronic lock mechanism to lock the electronic lock mechanism of the secure container in response to a determination that a package has been placed in the chamber of the secure container and the movable barrier is in the closed position.

\* \* \* \* \*